(12) United States Patent
Kohl et al.

(10) Patent No.: US 10,616,959 B2
(45) Date of Patent: Apr. 7, 2020

(54) ELECTRIC HEATING DEVICE

(71) Applicant: MAHLE International GmbH, Stuttgart (DE)

(72) Inventors: Michael Kohl, Bietigheim-Bissingen (DE); Falk Viehrig, Stuttgart (DE)

(73) Assignee: MAHLE International GmbH, Stuttgart (DE)

(*) Notice: Subject to any disclaimer, the term of this patent is extended or adjusted under 35 U.S.C. 154(b) by 0 days.

(21) Appl. No.: 15/962,467

(22) Filed: Apr. 25, 2018

(65) Prior Publication Data
US 2018/0310365 A1 Oct. 25, 2018

(30) Foreign Application Priority Data
Apr. 25, 2017 (DE) .................. 10 2017 206 964

(51) Int. Cl.
| H05B 3/50 | (2006.01) |
| F24H 3/04 | (2006.01) |
| B60H 1/22 | (2006.01) |
| H05B 3/14 | (2006.01) |
| F24H 9/18 | (2006.01) |
| H05B 3/24 | (2006.01) |

(52) U.S. Cl.
CPC ............. *H05B 3/50* (2013.01); *B60H 1/2225* (2013.01); *F24H 3/0429* (2013.01); *F24H 3/0435* (2013.01); *F24H 3/0441* (2013.01); *F24H 9/1872* (2013.01); *H05B 3/141* (2013.01); *H05B 3/24* (2013.01); *F24H 2250/04* (2013.01); *H05B 2203/02* (2013.01); *H05B 2203/023* (2013.01)

(58) Field of Classification Search
CPC ....... F24H 3/0441; F24H 3/0429; H05B 3/50; B60H 1/2225
See application file for complete search history.

(56) References Cited

U.S. PATENT DOCUMENTS 5,256,857 A * 10/1993 Curhan ................. F24H 3/0411
219/202
5,377,298 A * 12/1994 Yang ...................... H05B 3/148
219/504

(Continued)

FOREIGN PATENT DOCUMENTS

DE 4040258 A1 7/1992
DE 10355396 A1 6/2005

(Continued)

*Primary Examiner* — Kyung S Lee
(74) *Attorney, Agent, or Firm* — Muncy, Geissler, Olds & Lowe, P.C.

(57) ABSTRACT

The invention relates to an electric heating device with at least one electrically heatable heating element or with a plurality of electrically heatable heating elements, wherein at least one radiator element is thermally connected to the at least one heating element in order to heat a fluid flow, which flows against and/or around and/or through the at least one radiator element, wherein each heating element has at least one heater which heats up when electric current flows through the heater, wherein electrode elements are provided for electrically contacting the heater, wherein the electrode elements contacting a heater are arranged spaced from one another and accommodate at least one of the heater between them, wherein at least two heater are electrically interconnected in series.

9 Claims, 4 Drawing Sheets

(56) References Cited

U.S. PATENT DOCUMENTS

| | | | | |
|---|---|---|---|---|
| 5,471,034 | A * | 11/1995 | Kawate | B60H 1/2225 219/483 |
| 5,995,711 | A * | 11/1999 | Fukuoka | B60H 1/00328 219/202 |
| 6,178,292 | B1 * | 1/2001 | Fukuoka | F24H 1/009 165/175 |
| 6,472,645 | B1 * | 10/2002 | Bohlender | F24H 3/0429 219/505 |
| 7,667,165 | B2 * | 2/2010 | Bohlender | B60H 1/2225 219/201 |
| 7,777,161 | B2 * | 8/2010 | Zeyen | F24H 3/0405 219/201 |
| 8,057,946 | B2 * | 11/2011 | Whitehead | F24H 1/009 165/44 |
| 2005/0072774 | A1 * | 4/2005 | Bohlender | B60H 1/2225 219/548 |
| 2009/0121824 | A1 | 5/2009 | Feuerstein | |
| 2011/0297665 | A1 * | 12/2011 | Parker | H05B 3/22 219/494 |
| 2012/0061366 | A1 * | 3/2012 | Kohl | F24H 3/0429 219/202 |
| 2016/0214463 | A1 * | 7/2016 | Gries | H05B 1/0236 |
| 2016/0332507 | A1 | 11/2016 | Sweeney et al. | |

FOREIGN PATENT DOCUMENTS

| | | |
|---|---|---|
| DE | 102007049555 A1 | 4/2009 |
| DE | 102015107316 A1 | 11/2016 |

* cited by examiner

ELECTRIC HEATING DEVICE

This nonprovisional application claims priority under 35 U.S.C. § 119(a) to German Patent Application No. 10 2017 206 964.3, which was filed in Germany on Apr. 25, 2017, and which is herein incorporated by reference.

BACKGROUND OF THE INVENTION

Field of the Invention

The present invention relates to an electric heating device, in particular for heating a motor vehicle interior or for controlling the temperature in other applications.

Description of the Background Art

There is a need for heat in motor vehicles. Thus, motor vehicles usually have a heatable vehicle interior, which can be heated if desired for the comfort of the occupants. Other units of the motor vehicle can also be heated, such as, for example, an electrical energy storage, which is to be maintained at a certain minimum temperature so that it exhibits its full performance.

Motor vehicles with an internal combustion engine typically have a heating heat exchanger for this purpose which is connected in the cooling circuit of an internal combustion engine and through which hot coolant heated by the internal combustion engine flows. The coolant in this case is used primarily to cool the internal combustion engine. The waste heat of the internal combustion engine is transferred to the coolant and is used in a heating heat exchanger for heating the vehicle interior or for heating units. In this case, the air flowing through the heating heat exchanger or some other medium is heated. The heated air is supplied accordingly to the vehicle interior for regulating its temperature.

In particular, motor vehicles with low-consumption internal combustion engines, which generate less waste heat, and motor vehicles with a plug-in/range extender or purely electric vehicles with an electric drive need auxiliary heating devices or heating devices for interior heating. In this case, auxiliary heating or heating is desired or necessary primarily in the start-up phase and/or at low outside temperatures.

Various heating devices or auxiliary heating devices have become known for this purpose such as, for example, electric auxiliary heating devices or heating devices as well. The terms heating system and auxiliary heating system, heating and auxiliary heating, and heaters and auxiliary heaters are used basically synonymously in the following text in the context of the present invention and are hereinafter referred to only as heating system, heating, or heater.

The electric heating system has the advantage that the electric heating device necessary for this is relatively inexpensive compared with other solutions and that the heat generated is relatively spontaneously available and thus also noticeable spontaneously, because the electric power can be converted almost immediately into noticeable heat. Furthermore, electric heating devices are flexible in their installation space requirements and are also space-saving and thus can be installed flexibly in a motor vehicle.

In particular, for purely electrically powered vehicles, electric power of about more than 3 kW is required for heating. This also means that a high power density is advantageous. In such motor vehicles, the on-board system voltage is usually above 60 V, sometimes even over 400 V. Due to the high required electric heating power at the heater, this electric heating device is operated with the high voltage to keep the current strength arising during operation as low as possible.

In addition, there will also be the desire or readiness in the future for the voltage to be about 800 V or more in order to achieve faster charging of the electrical energy storage of the motor vehicle, so that the charging times become relatively short like refueling a current motor vehicle with an internal combustion engine.

Today's electric heating devices with PTC elements as heating elements reach their limits in this regard. The PTC elements are typically formed as ceramic rectangular blocks of small thickness and defined areal extent, which are in contact with both sides with contact electrodes in order to conduct the electric current through the PTC elements. In this regard, the PTC elements are substantially fixed in their thickness and they cannot be used much thicker, because otherwise the thermal conditions due to their own thermal conductivity will be disadvantageous due to the self-limiting effect of the PTC elements. The thickness of the PTC elements therefore has a practical upper limit, which cannot be arbitrarily increased without suffering thermal disadvantages. For example, if the thickness were doubled, the performance of the PTC elements would be significantly adversely affected. However, if the PTC elements in their present form with a small thickness remain within the upper limit of their thickness, their use in high voltage applications at 800 V or more would result in electrical flashovers between the contact electrodes, which should be urgently avoided.

SUMMARY OF THE INVENTION

It is therefore an object of the invention to provide an electric heating device which is improved over the prior art and yet is simple and inexpensive to manufacture.

An exemplary embodiment of the invention provides an electric heating device with at least one electrically heatable heating element or with a plurality of electrically heatable heating elements, wherein at least one radiator element is thermally connected to the at least one heating element in order to heat a fluid flow, which flows against and/or around and/or through the at least one radiator element, wherein each heating element has at least one heater which heats up when electric current flows through the heater, wherein electrode elements are provided for electrically contacting the heater, wherein the electrode elements contacting a heater are arranged spaced from one another and accommodate at least one of the heater between them, wherein at least two heater are electrically interconnected in series. It is thereby achieved that the voltage drop across a single heater is only a fraction of the nominally applied voltage, so that the voltage between the electrode elements is reduced and is below a voltage that allows an electrical flashover.

It is particularly advantageous if at least one heating element is provided which has at least two heater, wherein at least two of the heater are electrically interconnected in series within the heating element. As a result, a compact unit is achieved. For example, the heating element can have an external tube which can serve as protection against moisture or dirt.

It is also advantageous if at least one heating element is provided or multiple or all heating elements are provided, which has or have a first row of heater and/or which has or have a second row of heater, wherein the heater of the first row are connected in parallel to one another and the heater of the second row are electrically connected in parallel to one another, wherein the heater of the first row are electrically connected in series to the heater of the second row. It is thus achieved that the heater extend along the heating element and release the heat in a defined manner along the heating element.

It is also advantageous if at least two heating elements are provided, each having at least two heater, wherein the heater of a heating element are electrically connected in parallel to one another and in each case two heating elements are electrically connected in series. This can also achieve that the voltage drop across a heater is reduced.

In an exemplary embodiment, it is expedient for the heater of a heating element to be contacted in each case by two electrode elements, so that the heater of the particular heating element are connected in parallel and that in each case at least two heating elements are interconnected in series to one another via a contacting of electrode elements. This achieves a simple and uncomplicated serial connection.

It is advantageous, furthermore, if the heater of a row of heater are each contacted by two electrode elements, so that the heater of the particular row are connected in parallel, wherein in each case one electrode element of a first row is electrically connected to an electrode element of a second row. This also achieves that the serial connection is easily accomplished.

Thus, it is also advantageous if the electrically connected electrode elements are formed integrally connected to one another. As a result, a structurally particularly simple design is achieved with a simultaneous reduction in parts.

It is likewise expedient if the rows of heater are arranged spaced from one another by a free space, wherein a first electrical insulating rib engages in the free space. It is achieved thereby that the serial interconnection is achieved by the spacing and contacting via the electrode elements, wherein the insulating ribs serve to spatially separate the rows of heater from one another in an electrically isolated manner.

It is also advantageous if the electrode elements are covered by an electrical insulation element. Said insulation elements are used for the electrical insulation of the electrode elements outwardly in order to be able to achieve an encapsulation of the voltage-carrying parts.

It is advantageous if the first insulating rib is connected to a first element of the electrical insulation elements. As a result, a secure separation of the rows of heater and insulation of the rows are achieved.

It is also advantageous if a second element of the electrical insulation elements has two second insulating ribs, which accommodate two rows of heater between them.

It is also advantageous if the electrical insulation elements and the insulating ribs are formed of plastic or ceramic.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
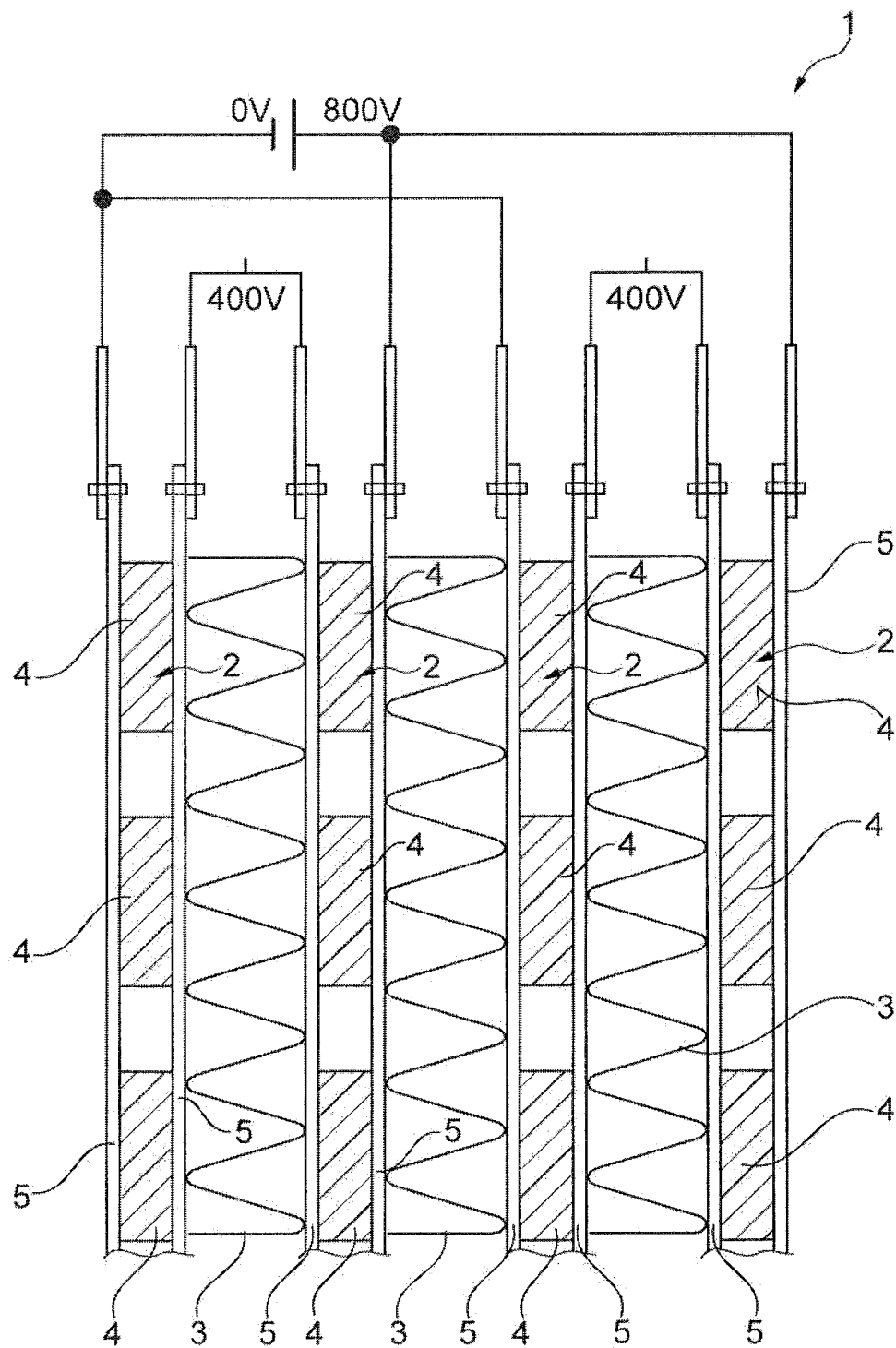
FIG. 1 is a schematic illustration of an exemplary embodiment of an electric heating device of the invention.

FIG. 1 shows a schematic illustration of an electric heating device 1 with at least one electrically heatable heating element 2 or with a plurality of electrically heatable heating elements 2. The exemplary embodiment of FIG. 1 shows four heating elements 2. Other exemplary embodiments may also include more or fewer heating elements 2.

Heating device 1 has one radiator element 3 or preferably a plurality of radiator elements 3 which are in thermal contact with heating elements 2. Thus, it can be seen in FIG. 1 that radiator elements 3 are arranged between in each case two heating elements 2. The arrangement of the radiator elements serves to heat a fluid flow, which flows against and/or around and/or through the at least one radiator element or radiator elements. Air is preferably used as the fluid flow, wherein other fluids can be heated such as, for example, liquid media such as water or the like.

A heating element 2 has at least one heater 4, which heats up when current flows through heater 4. In this case, the heater may be formed as PTC elements or as resistive elements with a negative temperature coefficient.

Electrode elements 5 are also provided for contacting heater 4 by means of which heater 4 are electrically contacted. FIG. 1 shows that electrode elements 5 are arranged on both sides of heater 4 in order to apply an electrical voltage to heater 4. Electrode elements 5 contacting a heater 4 are arranged spaced from one another and accommodate at least one of heater 4 between them.

In the exemplary embodiment of FIG. 1, three heater 4 are provided per heating element 2, which heater are electrically connected in parallel in the heating element. It is also possible to provide more or less heater 4 per heating element 2.

In the exemplary embodiment of FIG. 1, at least two heater 4 are electrically interconnected in series. It can be seen that two heating elements 2 with a number of heater 4 therein are electrically connected in series.

As an alternative to heater 4 of different heating elements 2 being electrically connected in series to one another, wherein heater 4 are also electrically connected in parallel to one another within a heating element 2, it can also be provided according to the invention that heater within a heating element are electrically connected to one another in series.

Figure 2:
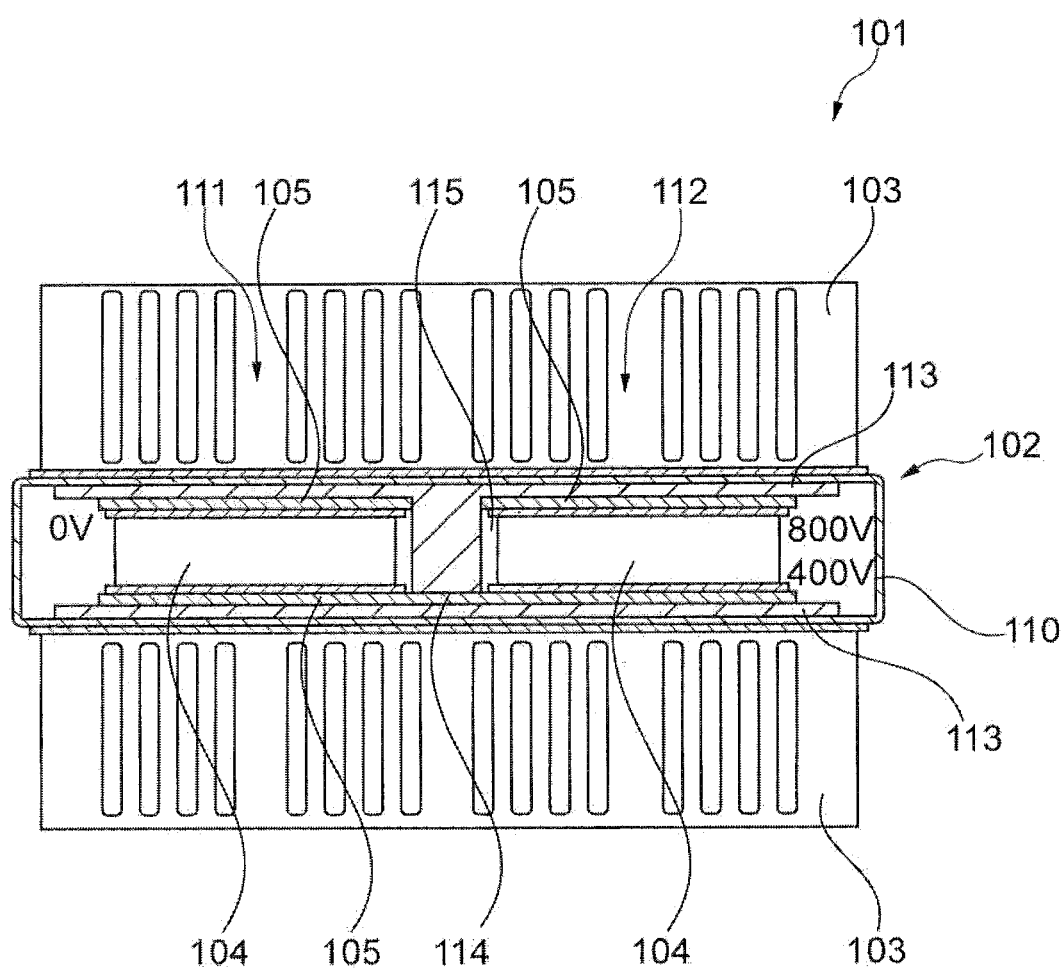
FIG. 2 is a sectional illustration of a heating element of an exemplary embodiment of an electric heating device of the invention.

FIG. 2 shows a section through a heating element 102, on which radiator elements 103 are arranged on the outside and on both sides.

Heating element 102 has two rows 111, 112 of heater 104 in a tube 110. These are arranged structurally parallel to one another.

Electric heating device 101 assembled from such heating elements has correspondingly at least one heating element 102, which has at least two heater 104, wherein at least two of heater 104 are electrically interconnected in series within heating element 102. Electric heating device 101 is thereby advantageously designed such that at least one heating element 102 is provided or multiple or all heating elements 101 are provided accordingly that has or have a first row 111 of heater 104 and that has or have a second row 112 of heater 104, wherein heater 104 of first row 111 are connected in parallel to one another and heater 104 of second row 112 are likewise electrically connected in parallel to one another, wherein heater 104 of first row 111 are electrically connected in series to heater 104 of second row 112. This is ensured in this case, because heater 104 are contacted by means of electrode elements 105. It can be seen in FIG. 2 that electrode elements 105 are formed on the top side of heater 104 separately from one another and electrically contact the rows of the heater separately, whereas the electrode elements on the bottom side of heater 104 are formed integrally or formed connected to one another, so that heater 104 on the bottom side are at the same electrical potential. The top electrode elements 105, on the contrary, are not at the same potential and effect a series connection of heater 104.

For each row 111, 112 of heater 104, a plurality of heater 104 are advantageously provided, therefore, at least two rows of heater 104, each row having at least two heater 104, wherein heater 104 of a row 111, 112 are electrically connected in parallel to one another and in each case two rows 111, 112 are electrically connected in series.

Heater 104 of a heating element 102 are advantageously contacted in each case by two electrode elements 105, so that heater 104 of the particular heating element 102 or the particular row 111, 112 are connected in parallel and that in each case at least two heating elements 104 are connected in series to one another via a contacting of electrode elements 105.

Correspondingly, heater 104 of a row 111, 112 of heater 104 are contacted in each case by two electrode elements 105 (see FIG. 2), so that the heater of the particular row 111, 112 are each connected in parallel, wherein in each case one electrode element 105 of a first row 111 is electrically connected to an electrode element 105 of a second row 112.

In this case, electrode elements 105 may be formed separately and electrically connected or, as shown in FIG. 2, the electrically connected electrode elements 105 may also be formed integrally connected to one another.

Insulation elements 113 are placed in each case above and below on electrode elements 105. In this case, one of the insulation elements 113 or both insulation elements 113 may have an insulating rib 114 which projects between heater 104 and spaces these apart.

Rows 111, 112 of heater 104 are arranged spaced from one another by a free space 115, wherein a first electrical insulating rib 114 engages in free space 115. Alternatively, two insulating ribs 114 can also engage in free space 115 from each opposite side.

FIG. 2 also shows that insulating rib 114 is integrally formed with one of insulation elements 113. For example, insulation elements 113 are made of plastic and molded in one piece with an insulating rib 114. Electrical insulation elements 113 and insulating ribs 114 may also be formed of ceramic and formed in one piece if necessary.

Thus, first insulating rib 114 is advantageously connected to a first element of electrical insulation elements 113. A second insulating element can also be connected to one or more further insulating ribs or formed in one piece.

Insulation elements 113 are used for electrical insulation with respect to surrounding tube 110.

Figure 3:
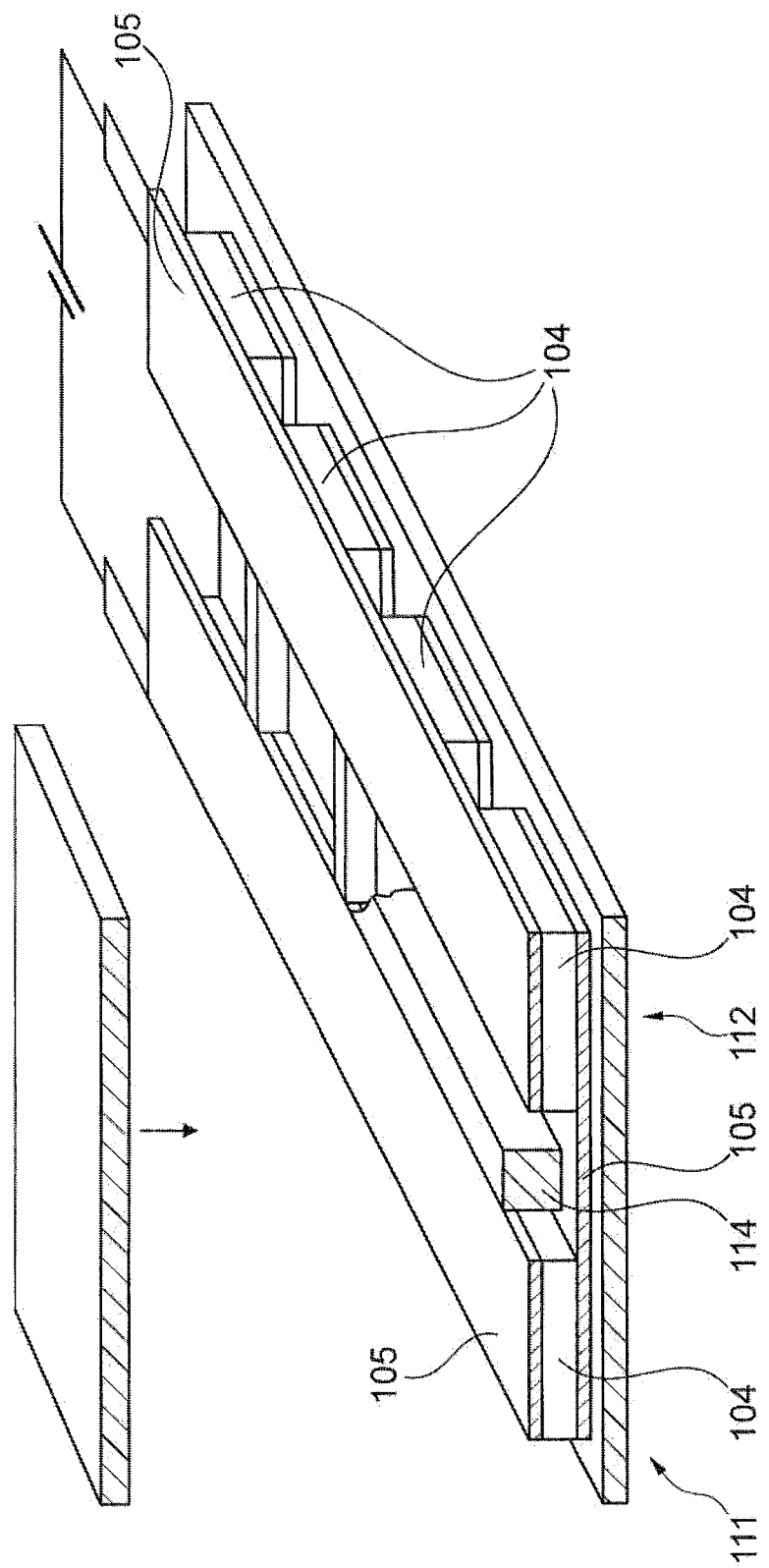
FIG. 3 is a partial perspective illustration of a heating element of an exemplary embodiment of an electric heating device of the invention.

FIG. 3 shows a further exemplary embodiment of an arrangement of heater 104 in two rows 111, 112. The rows of heater 104 lie on a common electrode element 105, wherein a respective electrode element lies on each row 111, 112 of heater 104 for contacting.

An insulating rib 114 is arranged between rows 111, 112. It separates rows 111, 112.

Each insulation element 113, which is formed rather plate-shaped, is placed on electrode elements 105. They preferably are formed of plastic.

Figure 4:
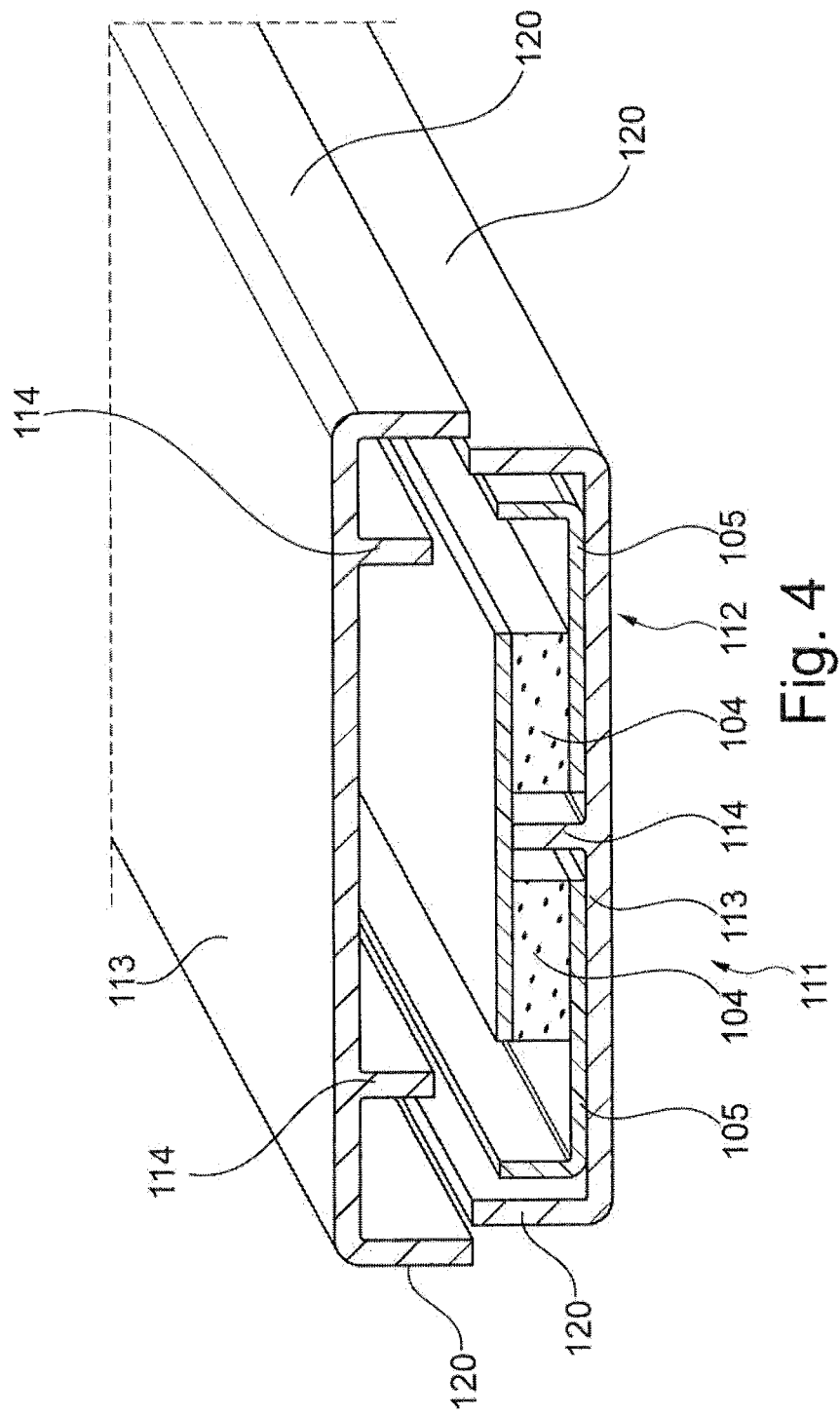
FIG. 4 is a partial perspective illustration of a heating element of an exemplary embodiment of an electric heating device of the invention.

FIG. 4 shows a further exemplary embodiment with ceramic insulation elements 113 and insulating ribs 114. In this case, an arrangement of heater 104 in two rows 111, 112 can be seen. Rows 111, 112 of heater 104 are covered by a common electrode element 105, wherein each row 111, 112 of heater 104 lies on a respective electrode element 105 for contacting. The individual electrode elements 105 are bent approximately at right angles at their lateral edge and point upwards, therefore, in the direction of the other electrode element 105.

An insulating rib 114 is arranged between rows 111, 112. It separates rows 111, 112.

Each insulation element 113, which is formed rather plate-shaped and also has bent edge regions, is placed on electrode elements 105. They preferably are formed of ceramic.

In this case, one of the insulation elements has a centrally arranged insulating rib 114 and laterally upwardly bent edges or edge regions 120, whereas a second element of electrical insulation elements 113 has two second insulating ribs 114 which accommodate the two rows of heater 104 between them. In this case, the edge or edge region 120 as well is again angled or bent. There is a free space, in which the edge region of the other insulation element 113 engages with the edge region of electrode element 105, between insulating ribs 114 and edge region 120.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric heating device comprising:
    at least one electrically heatable heating element, the heating element having heaters which heat up when electric current flows through the heaters;
    at least one radiator element thermally connected to the at least one heating element to heat a fluid flow that flows against or around or through the at least one radiator element; and
    electrode elements for electrically contacting the heaters, the electrode elements contacting at least two of the heaters that are spaced from one another and accommodate at least one of the heaters between them, wherein at least two of the heaters are electrically interconnected in series,
    wherein the at least one heating element has a first row of the heaters and has a second row of the heaters, wherein the heaters of the first row are electrically connected in parallel to one another and the heaters of the second row are electrically connected in parallel to one another, and wherein the heaters of the first row are electrically connected in series to the heaters of the second row, and wherein a first one of the electrode elements directly contacts an upper surface of the heaters solely of the first row and a second one of the electrode elements directly contacts an upper surface of the heaters solely of the second row, and wherein a third one of the electrode elements solely directly contacts a lower surface of a first one of the heaters in the first row and a lower surface of a first one of the heaters in the second row.

2. The electric heating device according to claim 1, wherein at least two heating elements are provided.

3. The electric heating device according to claim 1, wherein the first and second rows of heaters are arranged spaced from one another by a free space, wherein a first electrical insulating rib engages in the free space.

4. The electric heating device according to claim 3, wherein the electrode elements are covered by an electrical insulation element.

5. The electric heating device according to claim 4, wherein the first insulating rib is connected to a first element of the electrical insulation element.

6. The electric heating device according to claim 4, wherein a second element of the electrical insulation element has two second insulating ribs, which accommodate two rows of heaters between them.

7. The electric heating device according to claim 4, wherein the electrical insulation element and the first electrical insulating rib are formed of plastic or ceramic.

8. The electric heating device according to claim 1, wherein the electric heating device comprises a plurality of the at least one electrically heatable heating element.

9. The electric heating device according to claim 1, wherein a fourth one of the electrode elements solely directly contacts a lower surface of a second one of the heaters in the first row and a lower surface of a second one of the heaters in the second row.

* * * * *